Figures 1, 2:
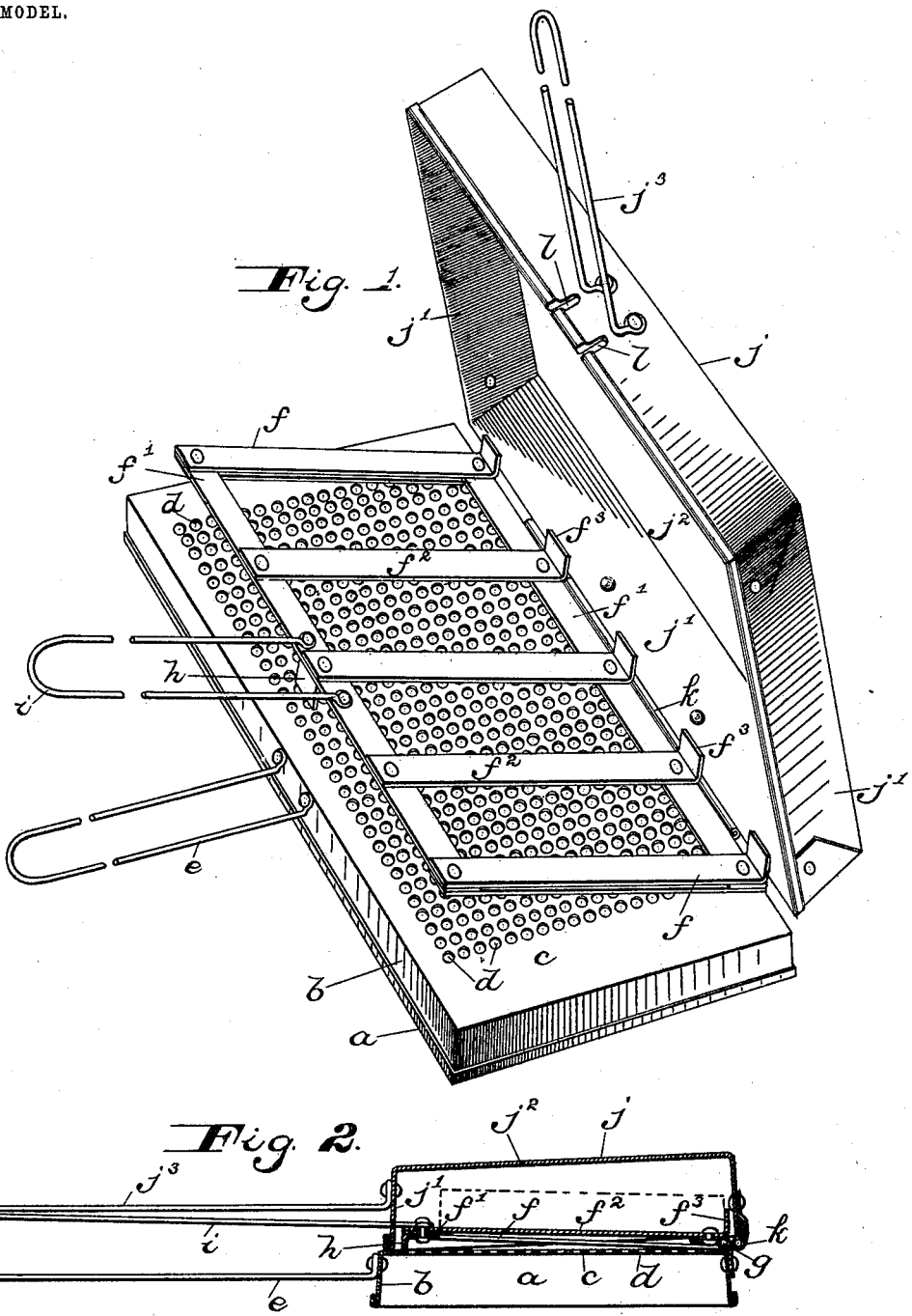

No. 719,253. PATENTED JAN. 27, 1903.
C. J. PARKER.
TOASTER.
APPLICATION FILED SEPT. 19, 1902.
NO MODEL.

Witnesses.
H. F. Meyer, Jr.
John B. Frich

Inventor.
Charles J. Parker.
By Mann & Co.
Attorneys.

UNITED STATES PATENT OFFICE.

CHARLES J. PARKER, OF HAVRE DE GRACE, MARYLAND.

TOASTER.

SPECIFICATION forming part of Letters Patent No. 719,253, dated January 27, 1903.

Application filed September 19, 1902. Serial No. 123,993. (No model.)

*To all whom it may concern:*

Be it known that I, CHARLES J. PARKER, a citizen of the United States, residing at Havre de Grace, in the county of Harford and State of Maryland, have invented certain new and useful Improvements in Toasters, of which the following is a specification.

My invention relates to a device for toasting bread, and is particularly adapted for use on vapor-stoves, where the toaster is to be brought in contact with the flame of the burners. It may also be used on ordinary ranges and coal-stoves.

The invention consists in the novel construction and combination of parts to be hereinafter pointed out.

The invention is illustrated in the accompanying drawings, in which—

Figure 1 is a perspective view of the toaster device open; and Fig. 2 is a cross-section through the center of the same, the parts being in the closed position.

Referring to the drawings by letters, $a$ designates a metallic base having vertical walls $b$ and a top $c$, uniting all the walls and forming a chambered space below the top. The top of said chamber is provided with perforations $d$, and a handle $e$ projects in a horizontal plane from the front wall $b$. A grilled frame $f$ has position on top of the chamber $a$ and is hinged at $g$ (see Fig. 2) to the top of said base. This frame in the present instance is rectangular in form and comprises two parallel longitudinal side bars $f'$ and a plurality of cross-bars $f^2$, which are secured to said side bars by rivets. The cross-bars at their inner ends are bent at right angles or in a substantially vertical direction to form stops $f^3$ for a purpose to be hereinafter described. At the front said frame is provided with a downwardly-projecting foot $h$, which when the frame is lowered rests on the perforated top $c$ of the base. By means of this foot $h$ it will be seen that the grilled frame $f$ is kept elevated or raised slightly above the surface of the top $c$, and thereby forms a space between said top and the frame. A handle $i$ projects from the front of the frame and in a direction parallel with the cross-bars $f^2$.

A metallic chambered cover $j$, having vertical walls $j'$ and top $j^2$, is hinged at $k$ to the base $a$, and said cover is also provided with a handle $j^3$. This chambered cover $j$ is large enough to fit down over and inclose the grilled frame $f$, so that when the device is closed a space will be provided above as well as below said grilled frame $f$. Two slots $l$ in the front vertical wall of the cover $j$ receive the wire handle $i$ of the grilled frame and permit the bottom edge of said front wall to pass down close against the top $c$ of the base $a$.

In operation the bread to be toasted is placed on top of the grilled frame $f$, with one edge against the stops $f^3$, as shown in dotted lines, Fig. 2. The cover $j$ is then closed over the bread and the grilled frame $f$. All three of these handles $e$, $i$, and $j^3$ may then be grasped by one hand. It will then be seen that a space will be formed between the bread and the top of the cover $j$ and another space formed between the bread and the perforated base $a$ on the bottom. The device is then placed on the stove and the heat and flame will pass up into the base-chamber $a$, and the perforations $d$ will permit only the heat to pass through the same into the space below the grilled frame $f$ and in contact with the bottom surface of the bread. The heat will then pass up through the frame $f$ and also around the latter and around the bread into the top chamber $j$, and thereby act on the sides and top surface of the bread. In order to inspect the bread during the toasting operation, it is only necessary to raise the cover $j$ by means of the handle $j^3$, when the top surface of the bread will be exposed. Then to inspect the bottom surface of the bread the grilled frame $f$ will be swung up by its handle $i$, the stops $f^3$ preventing the bread from sliding off the frame as the latter is raised and the bottom surface of the bread will be exposed to view.

Having thus fully described my invention, what I claim as new, and desire to secure by Letters Patent, is—

1. In a toaster, the combination of a lower bottomless chamber having a top provided with vents or perforations; a grilled frame hinged to swing on top of said lower chamber but raised above the latter whereby to form an air-space, and an upper bottomless chamber hinged to said lower chamber and adapted to swing down over said grilled frame whereby to inclose the latter and form an air-space around it.

2. In a toaster, the combination of a lower bottomless chamber having a top provided with vents or perforations; an upper bottomless chamber hinged to said lower chamber and adapted to swing down over said vents or perforations; and a grilled frame interposed between said two chambers and provided with a foot to keep it raised above said perforated top and also having a stop $f^3$ at its hinged side for holding the toast in place when the frame is raised.

In testimony whereof I affix my signature in the presence of two witnesses.

CHARLES J. PARKER.

Witnesses:
    JOS. C. PARKER,
    CLARENCE C. PUSEY.